2,916,382
Patented Dec. 8, 1959

2,916,382

PROCESS OF PREPARING A HONEY FLAVOR

Ian Douglas Morton, Bedford, and Edna Sharples, Chelmsford, England, assignors to Lever Brothers Company, New York, N.Y., a corporation of Maine No Drawing. Application November 10, 1958
Serial No. 772,696

9 Claims. (Cl. 99—140)

The present invention relates to flavoring, and more particularly to artificial flavoring substances and their preparation, and is a continuation-in-part of our co-pending U.S. application Serial No. 478,548, filed December 29, 1954, now abandoned.

It has been found that flavoring substances capable of imparting to foodstuffs a smell and taste similar to that of honey may be obtained by the reaction of at least one monosaccharide with alpha-amino-beta-phenylpropionic acid (beta phenylalanine), or its derivatives, in the presence of a large amount of water at elevated temperatures, preferably at or near the boiling point of the mixture.

The monosaccharide may be an aldohexose, such as glucose, galactose, or mannose; a ketohexose, such as fructose, or sorbose; a pentose, such as ribose, arabinose, xylose, lyxose, or rhamnose; or a mixture of any of these, such as invert sugar. Glucose, galactose, fructose, and ribose tend to produce a particularly potent flavoring substance. Certain polysaccharides, such as maltose, sucrose, or raffinose, which yield monosaccharides by hydrolysis under the conditions of the reaction, may also be used.

It is preferred to use alpha-amino-beta-phenylpropionic acid (beta-phenylalanine) as the amino reagent. Certain of its derivatives may also be used although the reaction product may be less potent. Such derivatives are the hydroxy-derivatives, such as the 4-hydroxy-derivative (tyrosine), and suitable salts, in particular the alkali metal or ammonium salts, or esters, in particular alkyl and, preferably, lower alkyl esters of beta-phenylalanine or its hydroxy-derivatives.

The proportion of monosaccharide to amino reagent is normally in excess of the equimolar ratio, from 1.8–2.5 to 1 being a particularly suitable ratio.

The amount of water present is usually at least 5 times the amount of the amino reagent and normally 10 to 25 times the amount of amino reagent is used, although amounts up to 50 times or more may be employed.

According to the preferred embodiment of the invention, equal amounts of a molar aqueous solution of a monosaccharide, preferably glucose, and an aqueous suspension containing 8.25% of beta-phenylalanine by weight, i.e., the amount of beta-phenylalanine which would give a 0.5 M solution if the amino acid were soluble to that extent, are admixed and then heated together.

To minimize any danger of charring, it is very desirable that the monosaccharide be brought into solution before heating is begun and preferably the monosaccharide is dissolved before the amino reagent is added. Thorough stirring of the mixed reagents is advisable before and, particularly, during heating to reduce the danger of local overheating and charring, while vigorous stirring during heating may reduce the time required for the completion of the reaction.

The reaction is preferably carried out at or near the boiling point of the mixture, heating being effected conveniently by means of an oil bath. The process may be carried out under sub- or superatmospheric pressure, if desired, when lower or higher temperatures, respectively, will be necessary to maintain the mixture at or near its boiling point. A reflux condenser is normally fitted to the reaction vessel while the reaction is in progress.

The progress of the reaction can be followed by fluorescence observations in ultraviolet light as well as by the smell of the reaction mixture. Normally, the mixture is maintained at its boiling point for about 1½ to about 3½ hours, and preferably from about 2½ to 3½ hours. However, when polysaccharides which yield monosaccharides by hydrolysis under the conditions of the reaction are employed, the heating is continued for about 8 hours or longer to allow for the hydrolysis of the polysaccharide into its monosaccharides. A pale green fluorescence often appears after about 1 to 1½ hours at the boiling point. As the reaction proceeds, the fluorescence tends to turn a purer green and then a bluish green and the odor becomes more intense, until eventually the fluorescence tends to fade to a paler green while the honey odor gives way to an odor of, first, charred honey and, then, burnt sugar. For the best results, heating is stopped when the fluorescence is at or near its most intense green and the mixture is then allowed to cool. The reaction product may be converted into a slightly hygroscopic powder by freeze-drying.

Although it is preferred to use the temperatures and times of reaction given above, other temperatures with other times of reaction may be employed according to the process of this invention. These conditions may be varied within fairly wide limits. For example, the heating of a mixture of phenylalanine and glucose at a temperature of 120° C. under reflux conditions produces a discernible honey flavor after 5 minutes and a strong honey flavor after 10 minutes. On the other hand, reacting of this same mixture under reflux conditions for 48 hours does not completely destroy the honey flavor.

At 100° C., a slightly longer reaction time is required. The honey flavor becomes discernible after 10 minutes and becomes quite strong after 30 minutes.

On the other hand, the flavor is still good after 24 hours of heating at this temperature.

At 50° C., 2 hours of heating are required before the honey flavor can be detected. Two weeks of heating at this temperature on the other hand does not destroy the good quality of the honey flavor. Thus the time and temperature conditions of the reaction can be varied over fairly wide limits, the only consideration being that for a lower temperature a longer period of heating is required to provide an optimum level of honey flavor.

Flavoring substances obtained according to the invention may be used as an ingredient in confectionery, as an essence, or in the preparation of artificial honey compositions. It is preferred to let the flavoring substance age for at least two days after its preparation before incorporating it in the foodstuff to be flavored. The process is easily controlled, and, hence, the properties of a particular flavoring substance are reproducible.

Specific examples of this process as applied to the various amino reagents are set forth below.

*Example 1*

10 cc. of a one molar aqueous solution of D-glucose and 10 cc. of a one-half molar aqueous suspension of DL-beta-phenylalanine, i.e., an aqueous suspension containing 8.25% by weight of DL-beta-phenylalanine, were mixed by stirring in a reaction vessel and the stirring continued during the subsequent heating. A reflux condenser was fitted to the reaction vessel and this was then heated in an oil bath, the temperature of which was maintained between 135 to 140° C. The reaction vessel remained in the oil bath for 2¾ hours and was then cooled.

Example 2

10 cc. of a one molar aqueous solution of D-ribose and 10 cc. of a one-half molar aqueous suspension of DL-beta-phenylalanine were mixed by stirring in a reaction vessel and the stirring continued during the subsequent heating. A reflux condenser was fitted to the reaction vessel and this was heated in an oil bath, the temperature of which was maintained between 135 to 140° C. The reaction vessel remained in the oil bath for 2¼ hours and was then cooled.

Example 3

10 cc. of a one molar aqueous solution of D-fructose and 10 cc. of a one-half molar aqueous suspension of DL-beta-phenylalanine were mixed by stirring in a reaction vessel and the stirring continued during the subsequent heating. A reflux condenser was fitted to the reaction vessel and this was then heated in an oil bath, the temperature of which was maintained between 135 to 140° C. The reaction vessel remained in the oil bath for 2¾ hours and was then cooled.

Example 4

5 cc. of a one molar aqueous solution of D-glucose, 5 cc. of a one molar aqueous solution of D-fructose, and 10 cc. of a one-half molar aqueous suspension of DL-beta-phenylalanine were mixed by stirring in a reaction vessel and the stirring continued during the subsequent heating. A reflux condenser was fitted to the reaction vessel and this was heated in an oil bath, the temperature of which was maintained between 135 to 140° C. The reaction vessel remained in the oil bath for 2¾ hours and was then cooled.

Example 5

10 cc. of a one molar aqueous solution of sucrose (which produced D-glucose and D-fructose in situ by prolonged hydrolysis under heat of the slightly acid nature of the solution, the pH of DL-beta-phenylalanine being 5.9) and 10 cc. of a one-half molar aqueous suspension of DL-beta-phenylalanine were mixed by stirring in a reaction vessel and the stirring continued during the subsequent heating. A reflux condenser was fitted to the reaction vessel and this was heated in an oil bath, the temperature of which was maintained between 135 to 140° C. The reaction vessel remained in the oil bath for at least 8 hours and was then cooled.

Example 6

10 cc. of a one molar aqueous solution of L-rhamnose and 10 cc. of a one-half molar aqueous suspension of DL-beta-phenylalanine were mixed by stirring in a reaction vessel and the stirring continued during the subsequent heating. A reflux condenser was fitted to the reaction vessel and this was heated in an oil bath, the temperature of which was maintained between 135 and 140° C. The reaction vessel remained in the oil bath for 2¾ hours and was then cooled.

Example 7

10 cc. of a one molar aqueous solution of raffinose and 10 cc. of a one-half molar aqueous suspension of DL-beta-phenylalanine were mixed by stirring in a reaction vessel and the stirring continued during the subsequent heating. A reflux condenser was fitted to the reaction vessel and this was heated in an oil bath, the temperature of which was maintained between 135 and 140° C. The reaction vessel remained in the oil bath for at least 8 hours and was then cooled.

Example 8

10 cc. of a one molar aqueous solution of D-glucose and 10 cc. of an aqueous suspension containing 9.65% by weight of the ethyl ester of DL-beta-phenylalanine were mixed by stirring in a reaction vessel and the stirring continued during the subsequent heating. A reflux condenser was fitted to the reaction vessel and this was then heated in an oil bath, the temperature of which was maintained between 135 to 140° C. The reaction vessel remained in the oil bath for from 3 hours to 3½ hours and was then cooled.

These artificial flavoring substances may be used in the preparation of artificial honey compositions. Artificial honey compositions as set forth in Examples 9 and 10 below were obtained by mixing the components set forth in either of the two examples and warming them with 2.5 cc. of water to obtain a very viscous liquid which was then allowed to cool.

Example 9

| | | |
|---|---|---|
| Sucrose | grams | 10 |
| Fructose | do | 10 |
| Glucose | do | 10 |
| Citric acid | do | 0.02 |
| L-glutamic acid | do | 0.02 |
| Product of Example 1 | cc | 0.5 to 1.0 |

Example 10

| | | |
|---|---|---|
| Sucrose | grams | 10 |
| Fructose | do | 10 |
| Glucose | do | 10 |
| Tartaric acid | do | 0.04 |
| Product of Example 1 | cc | 0.5 to 1.0 |

Citric acid and glutamic acid in Example 9 and tartaric acid in Example 10 serve to enhance the honey flavor.

Various modifications and changes may be made in the product and process of this invention without departing from the spirit thereof or sacrificing any of the advantages thereof, and hence, it will be understood that the invention is to be limited only within the scope of the appended claims.

We claim:

1. The process of preparing a honey flavor comprising reacting at least one monosaccharide with an amino-compound selected from the group consisting of beta-phenylalanine, its hydroxy-derivatives and suitable salts and esters of these acids, in the presence of water at an elevated temperature.

2. The process of preparing a honey flavor comprising reacting a mixture of monosaccharides with an amino-compound selected from the group consisting of beta-phenylalanine, its hydroxy-derivatives and suitable salts and esters of these acids, in the presence of water at an elevated temperature.

3. The process of preparing a honey flavor as set forth in claim 1 wherein the molar ratio of monosaccharide to the amino-compound is about 1.8–2.5 to 1.

4. The process of preparing a honey flavor as set forth in claim 1 wherein the temperature is at about the boiling point of the mixture.

5. The process of preparing a honey flavor as set forth in claim 1 wherein the monosaccharide is glucose.

6. The process of preparing a honey flavor comprising reacting at least one monosaccharide with an amino-compound selected from the group consisting of beta-phenylalanine, its hydroxy-derivatives and suitable salts and esters of these acids, said reaction being carried out in the presence of water at a temperature ranging from about 50° to about 130° C. for a time sufficient to develop the honey flavor.

7. The process of preparing a honey flavor comprising reacting at least one monosaccharide with an amino-compound selected from the group consisting of beta-phenylalanine, its hydroxy-derivatives and suitable salts and esters of these acids, said reaction being carried out in the presence of water for from about two minutes to about two weeks at a temperature ranging from about 50° C. to about 130° C., and the temperature and time of reaction being regulated to provide an optimum degree of honey flavor development.

8. The process of preparing a honey flavor comprising reacting at least one monosaccharide with an amino-compound selected from the group consisting of beta-phenylalanine, its hydroxy-derivatives and suitable salts and esters of these acids, said reaction being carried out in the presence of water for from about 1½ to about 3½ hours at a temperature approximating the boiling point of the reaction mixture.

9. The process of claim 8 wherein the monosaccharide is glucose.

References Cited in the file of this patent

UNITED STATES PATENTS

| 2,103,495 | Ruckdeschel | Dec. 28, 1937 |

FOREIGN PATENTS

| 107,367 | Great Britain | Mar. 18, 1918 |
| 448,813 | Great Britain | June 16, 1936 |